United States Patent
Venkatraman et al.

(10) Patent No.: US 9,973,677 B2
(45) Date of Patent: May 15, 2018

(54) REFOCUSABLE IMAGES

(71) Applicant: QUALCOMM Incorporated, San Diego, CA (US)

(72) Inventors: Subramaniam Venkatraman, Fremont, CA (US); Victor Kulik, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 14/053,436

(22) Filed: Oct. 14, 2013

(65) Prior Publication Data

US 2015/0103192 A1  Apr. 16, 2015

(51) Int. Cl.
*H04N 5/232* (2006.01)
*H04N 5/235* (2006.01)
*G06T 7/00* (2017.01)

(52) U.S. Cl.
CPC ......... *H04N 5/23212* (2013.01); *G06T 7/00* (2013.01); *H04N 5/2354* (2013.01); *H04N 5/2356* (2013.01); *H04N 5/23251* (2013.01); *H04N 5/23258* (2013.01); *H04N 5/23267* (2013.01); *H04N 5/23293* (2013.01)

(58) Field of Classification Search
CPC ..... H04N 5/232; H04N 5/228; H04N 5/23212
See application file for complete search history.

(56) References Cited

U.S. PATENT DOCUMENTS 6,320,979 B1 * 11/2001 Melen ................. G02B 21/367
348/E5.045
7,027,659 B1 * 4/2006 Thomas ............. H04N 13/0003
348/E13.008
8,384,803 B2 * 2/2013 Iizuka ...................... G06T 5/50
348/239

(Continued)

FOREIGN PATENT DOCUMENTS

EP  2085817 A2  8/2009
JP  2009089348 A  4/2009

(Continued)

OTHER PUBLICATIONS

Yang Q., et al., "Inertial Sensors Aided Image Alignment and Stitching for Panorama on Mobile Phones," MLBS '11 Proceedings of the 1st international workshop on Mobile location-based service, 2011, pp. 21-29.

(Continued)

*Primary Examiner* — Abdelaaziz Tissire

(57) ABSTRACT

Embodiments of the present invention are directed toward providing refocusable image. Refocusable images are images that, after being captured, can be refocused, or adjusted to have a different focal length. The embodiments described herein can utilize a mobile user device, such as a smartphone, without the need for specialized hardware. A camera of the mobile device can be configured to take a series of images in succession over a short period of time in which the focal length of the camera is varied so that each image has a different focal length. An image stack is created (Continued)

by aligning the images, and images are processed to determine which image has the highest contrast (i.e., is in focus) for each region of the image stack. Embodiments can further include displaying a first image of the series of images.

18 Claims, 6 Drawing Sheets

(56) References Cited

U.S. PATENT DOCUMENTS

| | | | |
|---|---|---|---|
| 2003/0052991 A1* | 3/2003 | Stavely et al. | 348/370 |
| 2003/0076408 A1* | 4/2003 | Dutta | 348/61 |
| 2005/0259888 A1* | 11/2005 | Ozluturk | H04N 5/23248 |
| | | | 382/260 |
| 2007/0009251 A1* | 1/2007 | Koskinen | 396/147 |
| 2007/0196089 A1* | 8/2007 | Yamaguchi | G03B 13/36 |
| | | | 396/56 |
| 2008/0112644 A1* | 5/2008 | Yokohata | G06K 9/64 |
| | | | 382/278 |
| 2008/0246852 A1* | 10/2008 | Mori | G06K 9/00228 |
| | | | 348/222.1 |
| 2009/0167923 A1* | 7/2009 | Safaee-Rad et al. | 348/345 |
| 2010/0033617 A1* | 2/2010 | Forutanpour | G06T 7/571 |
| | | | 348/345 |
| 2010/0165152 A1* | 7/2010 | Lim | G06T 5/50 |
| | | | 348/240.99 |
| 2011/0025830 A1* | 2/2011 | McNamer et al. | 348/50 |
| 2011/0141239 A1* | 6/2011 | Kennedy | 348/47 |
| 2012/0057786 A1* | 3/2012 | Yano | H04N 5/232 |
| | | | 382/170 |
| 2012/0069141 A1 | 3/2012 | Sim et al. | |
| 2012/0081560 A1* | 4/2012 | Park | H04N 5/23219 |
| | | | 348/208.12 |
| 2012/0249550 A1* | 10/2012 | Akeley | H04N 5/232 |
| | | | 345/419 |
| 2012/0306999 A1 | 12/2012 | Zhou | |
| 2013/0010067 A1 | 1/2013 | Veeraraghavan et al. | |
| 2013/0044254 A1 | 2/2013 | Tzur | |
| 2013/0120610 A1* | 5/2013 | Tsubaki | H04N 5/235 |
| | | | 348/229.1 |
| 2013/0342526 A1* | 12/2013 | Ng | G06T 15/205 |
| | | | 345/419 |
| 2014/0125831 A1* | 5/2014 | Chan | H04N 1/215 |
| | | | 348/222.1 |
| 2014/0169689 A1* | 6/2014 | Ohsawa | G06T 7/0081 |
| | | | 382/224 |
| 2014/0192076 A1* | 7/2014 | Tan | H04N 9/3147 |
| | | | 345/582 |
| 2014/0198242 A1* | 7/2014 | Weng | H04N 5/23293 |
| | | | 348/333.09 |

FOREIGN PATENT DOCUMENTS

| | | |
|---|---|---|
| JP | 4972579 B2 | 7/2012 |
| TW | 201331693 A | 8/2013 |
| WO | WO-2014124787 A1 | 8/2014 |
| WO | WO20140193377 A1 * | 12/2014 ............... G06T 3/00 |

OTHER PUBLICATIONS

International Search Report and Written Opinion—PCT/US2014/059953—ISA/EPO—dated Feb. 9, 2015.

* cited by examiner

REFOCUSABLE IMAGES

BACKGROUND

Refocusable images, or "living pictures," are becoming popular due to recent consumer products utilizing specialized technology. These technologies use proprietary hardware to make images that can be refocused after they are captured by, for example, selecting different parts of an image. Selected parts can become in focus. This allows the viewer a more interactive image viewing experience. However, the proprietary hardware used to enable this functionality can be expensive.

SUMMARY

Embodiments of the present invention are directed toward providing refocusable images by a mobile user device, such as a smartphone, without the need for such hardware. A camera of a mobile device can be configured to take a series of images in succession over a period of time. During the period of time, the focal length of the camera is varied—regardless of what is being captured—such that each image of the series of images is captured using a different focal length. The images are aligned with each other using, for example, motion sensor data from when the images were being captured. The images are further processed by dividing each image into regions (e.g., a grid), calculating a level of contrast for each region, and comparing corresponding regions for each image in the series of images to determine which image has the corresponding region with the highest contrast. Embodiments can further include displaying a first image of the series of images. The series of images provide refocusable image functionality because a user can select different portions of the displayed image to become in focus, causing the image of the series of images having the selected portion in focus to be displayed.

An example method of image capture and processing, according to the disclosure, includes capturing a plurality of images in succession over a period of time with a camera, where the capturing is triggered by a user input. The method further includes varying a focal length of the camera during the period of time such that each image of the plurality of images is captured using a unique focal length, and aligning the plurality of images using motion sensor data taken during the period of time. The method also includes processing, with a processing unit, the plurality of images by dividing each image into a plurality of regions, each region having a corresponding region in each of the plurality of images, calculating a level of contrast for each region of a first set of corresponding regions, comparing the levels of contrast for regions of the first set of corresponding regions, and determining a first image having a highest-level of contrast in the first set of corresponding regions. The method also includes causing a display to show the first image when one of the first set of corresponding regions is selected.

The example method of image capture and processing can further include one or more of the following features. One of the first set of corresponding regions can be selected from an initial displayed image of the plurality of images. The aligning can occur during the period of time in which the plurality of images is captured. Processing the plurality of images can be performed by a mobile device. Processing the plurality of images can be performed by a computing device other than a mobile device. The method can further comprise receiving a selection, from the first image, of one of a second set of corresponding regions, determining a second image, from the plurality of images, having a highest-level of contrast in the second set of corresponding regions, and causing the display to show the second image. The method can further comprise removing, from the plurality of images, one or more images in which none of the plurality of regions of the image is determined to be the highest-contrast region among the corresponding regions of the plurality of images. Aligning the plurality of images can comprise at least one of scaling one or more images of the plurality of images, shifting one or more images of the plurality of images, rotating one or more images of the plurality of images, or adjusting a brightness of one or more images of the plurality of images. The motion sensor data can be obtained from at least one of a gyroscope, an accelerometer, or the camera.

An example apparatus, according to the disclosure, can include a memory, a display, and a processing unit communicatively coupled with the memory. The processing unit is configured to perform functions including obtaining a plurality of images captured in succession over a period of time by a camera of a mobile device, where the capturing is triggered by a user input, and a focal length of the camera is varied during the period of time such that each image of the plurality of images is captured using a unique focal length. The processing unit is also configured to perform functions including aligning the plurality of images using motion sensor data taken during the period of time, and processing the plurality of images by dividing each image into a plurality of regions, each region having a corresponding region in each of the plurality of images calculating a level of contrast for each region of a first set of corresponding regions, comparing the levels of contrast for regions of the first set of corresponding regions, and determining a first image having a highest-level of contrast in the first set of corresponding regions. The processing unit is further configured to perform functions including causing the display to show the first image when one of the first set of corresponding regions is selected.

The example apparatus can further include one or more of the following features. The processing unit can be configured to perform the aligning during the period of time in which the plurality of images is captured. The apparatus can comprise the mobile device. The apparatus can comprise a computing device other than the mobile device. The processing unit can be further configured to receive a selection, from the first image, of one of a second set of corresponding regions determine a second image, from the plurality of images, having a highest-level of contrast in the second set of corresponding regions, and cause the display to show the second image. The processing unit can be further configured to remove, from the plurality of images, one or more images in which none of the plurality of regions of the image is determined to be the highest-contrast region among the corresponding regions of the plurality of images. The processing unit is further configured to align the plurality of images by scaling one or more images of the plurality of images, shifting one or more images of the plurality of images, rotating one or more images of the plurality of images, or adjusting a brightness of one or more images of the plurality of images.

An example non-transitory computer-readable storage medium, according to the description, can have instructions embedded thereon for providing refocusable images. The instructions comprise computer code for obtaining a plurality of images in succession over a period of time with a camera of a mobile device, where the capturing is triggered by a user input. The instructions further comprise computer code for causing the camera to vary a focal length during the period of time such that each image of the plurality of images is captured using a unique focal length, and aligning the plurality of images using motion sensor data taken during the period of time. The instructions also comprise computer code for processing the plurality of images by dividing each image into a plurality of regions, each region having a corresponding region in each of the plurality of images, calculating a level of contrast for each region of a first set of corresponding regions, comparing the levels of contrast for regions of the first set of corresponding regions, and determining a first image having a highest-level of contrast of the first set in corresponding regions. The instructions also comprise computer code for causing a display to show the first image when one of the first set of corresponding regions is selected.

The example non-transitory computer-readable storage medium can also comprise one or more of the following features. The code for aligning can be configured to cause the aligning to occur during the period of time in which the plurality of images is captured. The non-transitory computer-readable storage medium can include code for receiving a selection, from the first image, of one of a second set of corresponding regions, determining a second image, from the plurality of images, having a highest-level of contrast in the second set of corresponding regions, and causing the display to show the second image. The non-transitory computer-readable storage medium can include code for removing, from the plurality of images, one or more images in which none of the plurality of regions of the image is determined to be the highest-contrast region among the corresponding regions of the plurality of images. The code for aligning the plurality of images can include code for performing at least one of scaling one or more images of the plurality of images, shifting one or more images of the plurality of images, rotating one or more images of the plurality of images, or adjusting a brightness of one or more images of the plurality of images.

An example device, according to the disclosure, can include means for obtaining a plurality of images in succession over a period of time with a camera of a mobile device, where the capturing is triggered by a user input. The device also includes means for causing the camera to vary a focal length during the period of time such that each image of the plurality of images is captured using a unique focal length, and means for aligning the plurality of images using motion sensor data taken during the period of time. The example device further includes means for processing the plurality of images by dividing each image into a plurality of regions, each region having a corresponding region in each of the plurality of images, calculating a level of contrast for each region of a first set of corresponding regions, comparing the levels of contrast for regions of the first set of corresponding regions, and determining a first image having a highest-level of contrast of the first set in corresponding regions. The device also includes means for causing a display to show the first image when one of the first set of corresponding regions is selected.

The example device can further include one or more of the following features. The device of claim 22, wherein the means for aligning is configured to cause the aligning to occur during the period of time in which the plurality of images is captured. The device can include means for receiving a selection, from the first image, of one of a second set of corresponding regions, determining a second image, from the plurality of images, having a highest-level of contrast in the second set of corresponding regions, and causing the display to show the second image. The device can also include means for removing, from the plurality of images, one or more images in which none of the plurality of regions of the image is determined to be the highest-contrast region among the corresponding regions of the plurality of images. The means for aligning the plurality of images comprises at least one of means for scaling one or more images of the plurality of images, means for shifting one or more images of the plurality of images, means for rotating one or more images of the plurality of images, or means for adjusting a brightness of one or more images of the plurality of images.

Items and/or techniques described herein may provide one or more of the following capabilities, as well as other capabilities not mentioned. Techniques can provide for providing refocusable, or "living," images without the need for specialized hardware. This can not only provide such functionality to mobile devices without increasing cost, but can also provide higher resolution than proprietary solutions. These and other advantages and features are described in more detail in conjunction with the text below and attached figures.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
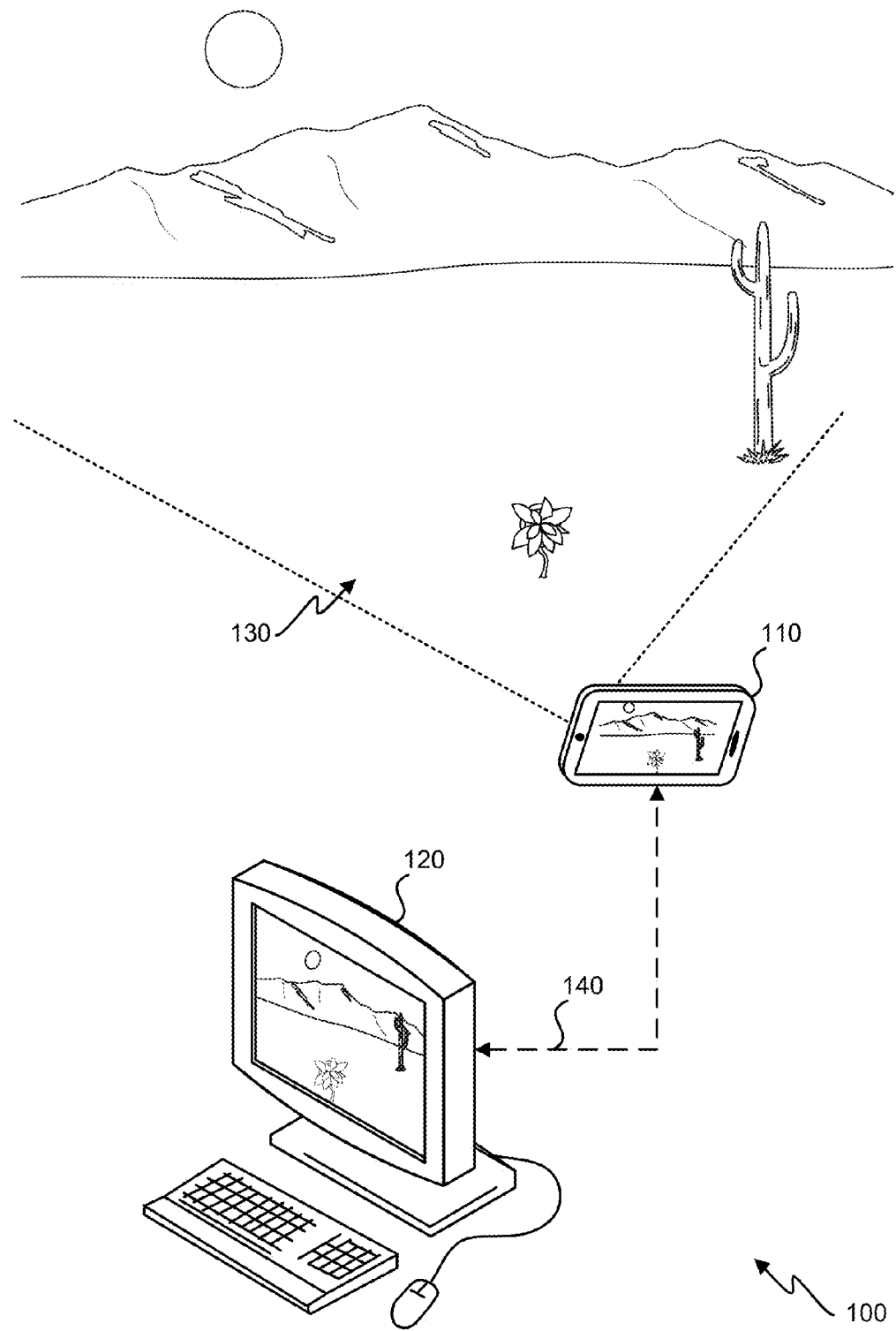
FIG. 1. is an illustration of an embodiment of a system that can capture and display refocusable images using the techniques described herein.

The following description is provided with reference to the drawings, where like reference numerals are used to refer to like elements throughout. While various details of one or more techniques are described herein, other techniques are also possible. In some instances, structures and devices are shown in block diagram form in order to facilitate describing various techniques.

Embodiments of the present invention are directed toward providing refocusable image. Refocusable images are images that, after being captured, can be refocused, or adjusted to have a different focal length. The embodiments described herein can utilize a mobile user device, such as a smartphone, without the need for specialized hardware. A camera of the mobile device can be configured to take a series of images (e.g., a static scene) in succession over a short period of time in which the focal length of the camera is varied so that each image has a different focal length. An image stack is created by aligning the images, and images are processed to determine which image has the highest contrast (i.e., is in focus) for each region of the image stack. Embodiments can further include displaying a first image of the series of images. The image stack can provide refocusable image functionality because a user can select different portions of a displayed image to become in focus, causing the image of the series of images having the selected portion in focus to be displayed. Thus, a refocusable image, according to the disclosed techniques, may comprise an image stack.

FIG. 1 illustrates an embodiment 100 of a system that can implement the functionality described herein. The illustrated embodiment 100 includes a mobile device 110 and a display device 120. Other embodiments may incorporate all functionality on the mobile device 110, split the functionality between the mobile device 110 and the display device 120 in a manner different than described herein, and/or include additional devices to perform different functions. Hardware and software components of the mobile device 110 and display device 120 are described in more detail hereafter, in relation to FIG. 8. A person or ordinary skill in the art will recognize many omissions, substitutions, and/or other variations.

The mobile device 110 can comprise any of a variety of personal electronic devices having a camera, such as a smartphone or other cell phone, tablet computer, personal camera, a laptop, a head mounted display, and the like. The mobile device can be configured to capture a series of images of a scene 130 with its camera. (Note, the mobile device's camera is not visible in FIG. 1, but is on the back side of the mobile device 110. Dotted lines represent a field of view of the mobile device's camera.) While the images are being captured the focal length of the camera can vary (e.g., from near to far) so that each image has a different focal length. The number of images can vary, depending on desired functionality. A user may be presented with a special menu item, button, or other interface to select this functionality. For example, a smartphone's user interface may have a camera menu in which the user is able to select between single shot, rapid shot, camera, refocusable image, and the like. The capture of the series of images may be triggered by a single input, such as the user pressing a shutter button in the same manner as capturing a single image in single-shot mode.

Varying the focal length across a range of focal lengths as images are being taken can be implemented in different ways, depending on the embodiment. In some instances, for example, the functionality may be provided at an application layer, by an application and/or operating system of the mobile device 110. In other instances, such functionality may not be available at an application layer, but instead may be implementable using hardware and/or software for controlling the functionality of the camera. In either embodiment, the mobile device 110 can provide a user interface by which the user is able to select the refocusable image functionality. In some embodiments, the refocusable image functionality may be automatically selected in certain scenarios or by certain applications.

The number of images captured and the exposure time for each images can vary, depending on desired functionality. In some embodiments, for example, images can be captured using video (or a similar manner) using a constant frame rate (i.e., rate of frames captured per second). In other embodiments, the exposure time for some images in the series of images may be longer or shorter than the exposure time for other images in the series of images. Thus, the "effective frame rate" can vary as images are being taken. The number of images taken in a series of images can be as little as 2, as much as 100 or more, or any amount in between, depending on the desired functionality. In some embodiments, the mobile device 110 may determine a number of images to take beforehand (e.g., by utilizing image and/or other sensor data to determine which focal lengths may be of interest). Some embodiments may have certain predetermined focal lengths and/or a predetermined range of focal lengths commonly used in image capture.

To provide the refocusable functionality, the series of images can be of a static scene 130, with no movement. Because the mobile device 110 is likely held in a user's hand (rather than on a tripod, for example), it is subject to tremors and other hand movements which the series of images is being captured. To compensate for this, the mobile device 110 can register images, aligning the images in the series of images to compensate for movements.

Image registration can utilize forms of electronic image stabilization (EIS) used in video capture. Forms of EIS using image processing (e.g., aligning like features of images) may not be reliable because in-focus features in one image may be out of focus in another image. However, sensor-based EIS can be utilized, in which data from motion sensors such as gyroscopes, accelerometers, and the like, can be used to determine a movement of the mobile device 110 and align images by compensating for the determined movement. The mobile device's motion sensor data can be synchronized with image capture data, thereby enabling a device to determine when movement occurred with respect to image capture and how such movement may affect image alignment. Depending on the desired functionality, image registration can occur in real time as the images are being captured by the device. In other embodiments, because the series of images for refocusable functionality are captured in quick succession, all or a portion of the images may be captured at a fast rate that at which the mobile device 110 is unable to perform image registration in real time. In such instances images and corresponding motion sensor data can be stored for later image registration by the mobile device 110, display device 120, and/or other device (not shown). Image registration and/or image alignment may also involve scaling (i.e., adjusting the size of), shifting, and/or rotating one or more images to compensate for zooming, movement, and/or other effects that may occur while the focal length of the camera is being varied. Additionally or alternatively, brightness levels of one or more images may be adjusted to compensate for images that may have a different exposure and/or artificially brighten up dark regions when they are selected by a user for viewing.

Image data of the aligned series of images, or image stack, can optionally be provided to a display device 120 to allow a user to view the refocusable image. The image data can be provided using a communication link 140, which can employ any of a variety of wired and/or wireless technologies. The display device 120 can comprise any of a variety of electronic devices (e.g., a personal computer, tablet computer, television, video game system, and the like) capable of displaying the image stack and receiving user input. Depending on the desired functionality, the images of the image stack may be processed by hardware and/or software of the display device 120 and/or mobile device 110, as discussed in further detail below, to determine the image of the image stack that is in best focus for a given region of the image stack. An image of the image stack is displayed by the display device 120 as a refocusable image. When a user selects a region of the refocusable image, the image of the image stack in which the selected region is has the best focus will be displayed. Additionally or alternatively, embodiments may allow the refocusable image to be viewed on a display of the mobile device 110.

Methods of selecting a region can vary, depending on desired functionality, capabilities of a display device, and/or other factors. For example, a user may select a region by simply clicking on the region using a mouse-controlled cursor or tapping on the region if displayed on a touchscreen. Some embodiments may involve displaying the refocusable image on a device capable of tracking eye movements. In these embodiments, a user may select a region by simply looking at it, looking while performing a gesture (e.g., pushing a button, blinking, etc.), and/or performing similar eye-based gestures. Such methods of selection may be configurable by a user.

Figure 2A:
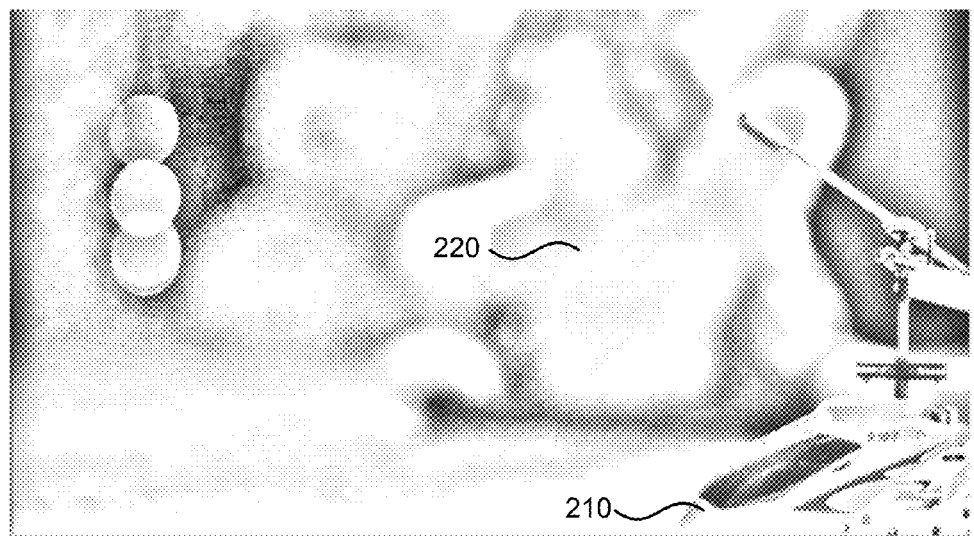
FIGS. 2A and 2B are example black-and-white representations of captured images that help illustrate the functionality of how refocusable images can be displayed.
Figure 2B:
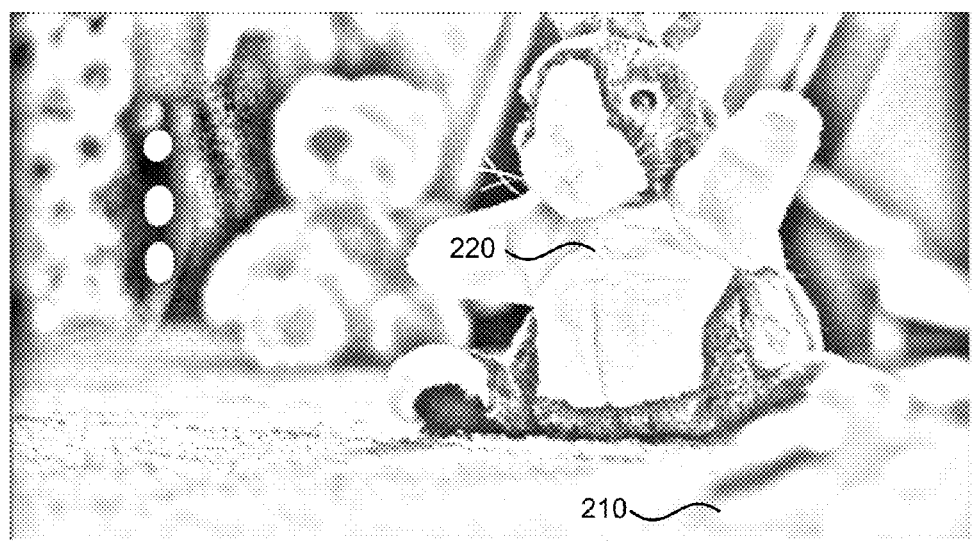

FIGS. 2A and 2B are example black-and-white representations of captured images that help illustrate the functionality of how refocusable images can be displayed. The images can be part of an image stack that is displayed as a refocusable image by, for example, the display device 120 of FIG. 1. As a user selects different regions of the refocusable image, the image with the selected region in focus is displayed.

For example, the display device 120 may show the refocusable image by initially showing a default image of the image stack. The initial image can be the first image of the stack, or selected another way (e.g., the image with a center portion of the image in focus, the image having the most common focal length, the image having the largest portion of the image in focus, etc.). If the user selects the toy helicopter 210 in the lower right-hand corner of the image, the image of FIG. 2A—in which the toy helicopter 210 is in focus—is displayed. If the user then selects the stuffed bunny 220, the image of FIG. 2B—in which the stuffed bunny 220 is in focus—is displayed. Although only two images are shown in FIGS. 2A and 2B, the image stack can comprise a large number of images, enabling a user to select many other portions of the refocusable image and view the corresponding image of the image stack in which the selected portions are in focus. Thus, although it comprises an image stack, the refocusable image behaves like a single image that adjusts its focus based on user input.

Figure 3:
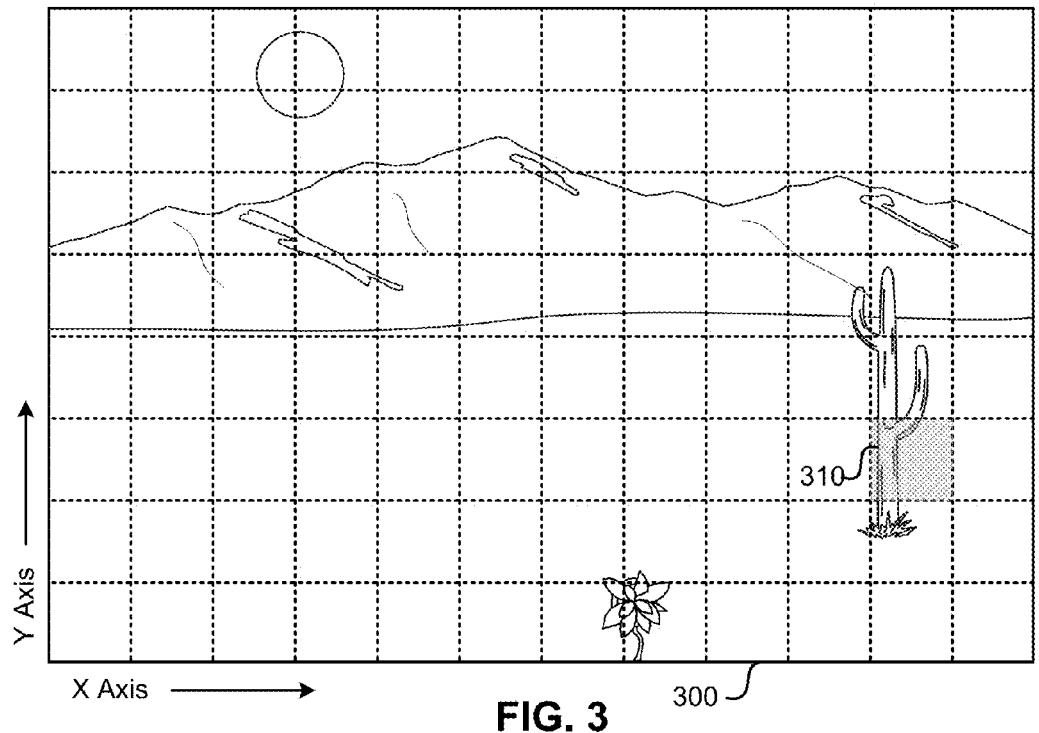
FIG. 3 is a simplified illustration of how an image can be split into various regions for processing, according to one embodiment.

FIG. 3 is a simplified illustration of how an image 300 can be split into various regions for processing, according to one embodiment. In this embodiment, the image 300 is simply split into different regions according to a grid, with columns and rows distributed along X and Y axes. (Although the grid lines are visible in FIG. 3, they may represent invisible boundaries between regions. However, in some embodiments, a refocusable image may show visible region boundaries.) The number of rows and columns of the grid can vary, depending on the embodiment. Some embodiments, for example, may simply split the image into a grid of a default number of rows and columns (e.g., 20 rows and 20 columns). Other embodiments may base the number of rows and/or columns based on factors such as image resolution, image processing capabilities, and the like. Some embodiments may dynamically determine the number of rows and/or columns in the grid based on a number of detected features in one or more images of the image stack, a number of images in the image stack, and/or another factor that may vary from one image stack to the next. Other embodiments may divide images of an image stack into various regions in a matter other than a grid. Such regions may be determined independent from the content of the image stack, or may divide visible portions of the image stack, such as different objects, into different regions. Moreover, in some embodiments, the various regions may be based on detected features in one or more images of the image stack.

Figure 4:
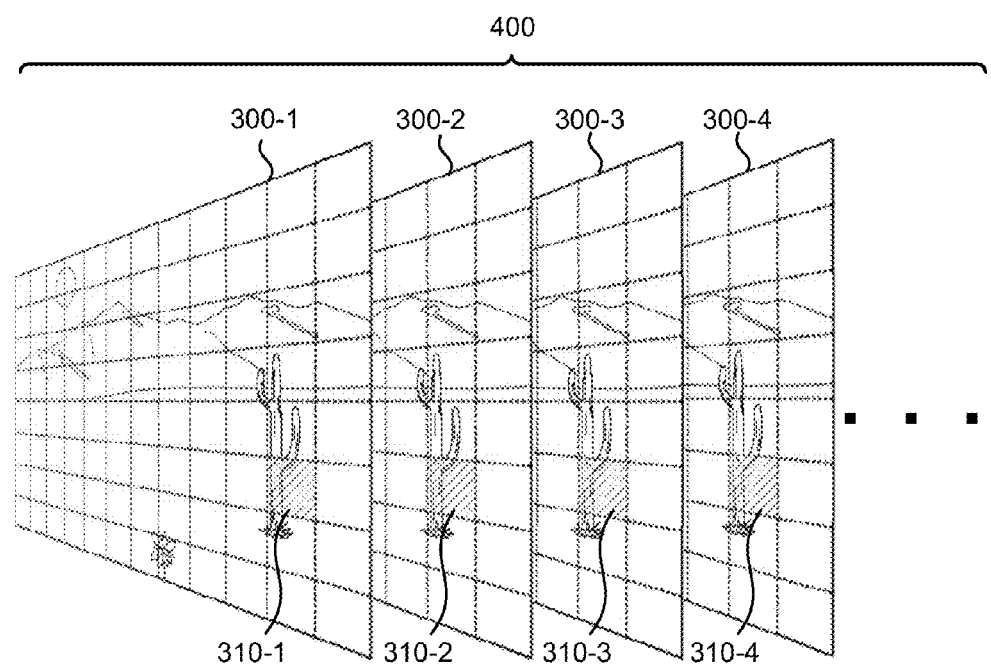
FIG. 4 illustrates how regions are compared among an image stack.

FIG. 4 illustrates how regions are compared among an image stack 400. During image processing, each region of a certain image is compared with corresponding regions of other images 300 in the image stack 400 to determine which region is in focus (or the closest to being in focus). For example, a particular region 310-1 of a first image 300-1 is analyzed and compared with corresponding regions 310-2, 310-3, 310-4 of other images 300-2, 300-3, 300-4 in the image stack 400. (As indicated in FIG. 4, an image stack can include more than 4 images.) The image 300 having the region 310 that is in focus or closest to being in focus, is the image that is displayed when the user selects that particular region 310. Because the focal length for each image 300 in the image stack 400 is unique, there will be one image that will have the most in-focus region 310. For example, if the region 310-3 of the image 300-3 is determined to be the most in-focus of all the corresponding regions 310 of the images 300 in the image stack 400, then when a user is shown the refocusable image and selects the region 310, the image 300-3 will be shown to the user. Images 300 that do not have any regions determined to be in focus or closest to being in focus of all corresponding regions of images 300 in an the image stack 400 can be removed from the image stack, which can reduce the amount of memory required to store the image stack.

It can be noted that, depending on various factors, such as the capabilities of a display device showing the refocusable image, the image processing illustrated in FIGS. 3-6 may occur before the image is displayed, or in real time, as the image is being displayed to the user. In cases where the processing is done before the refocusable images is shown to the user, the results of the comparisons of regions of the images 300 in the image stack, as discussed in relation to FIG. 4, can be stored and later used when the refocusable image is shown to the user.

Figure 5:
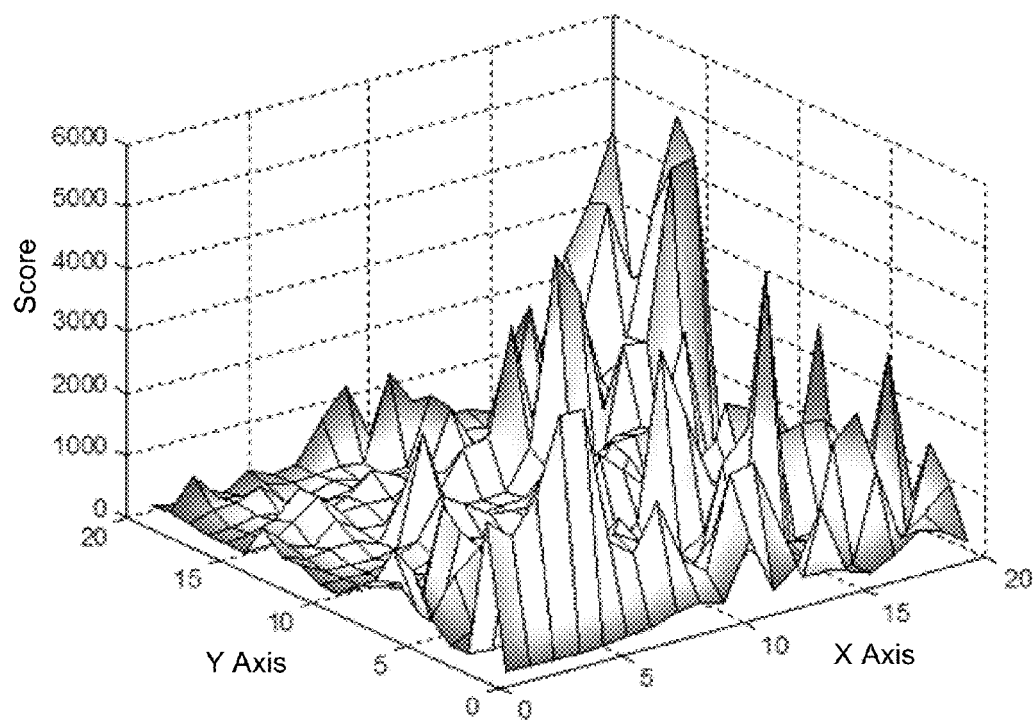
FIG. 5 is a 3-dimensional diagram indicating a contrast measurement for each region of a 2-dimensional image.
Figure 6:
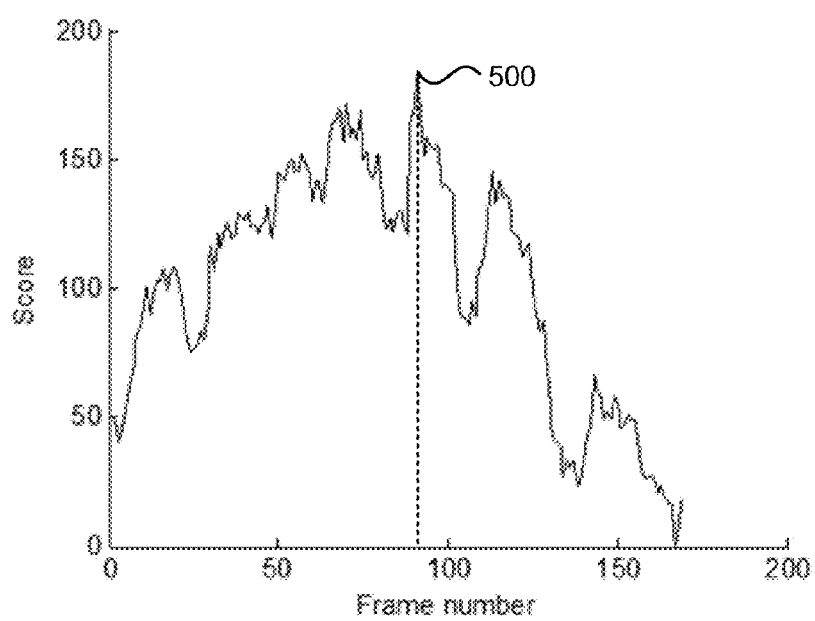
FIG. 6 is a graph illustrating the comparison of a contrast score for corresponding regions of all images in an image stack, according to one example.

The determination of which image 300 has the region that is most in focus of all corresponding regions of images in an image stack 400, can be made in any of a variety of ways. FIGS. 5 and 6 illustrate a method of determining how the focus of a region can be measured and compared with corresponding regions of other images.

FIG. 5 is a 3-dimensional diagram indicating a score, or measurement, of contrast for each region of an image 300, where the image is separated into regions using 20×20 grid along X and Y axes of the image 300. Contrast is a measure of focus; the higher the contrast, the greater the focus. According to this embodiment, the contrast score is determined by calculating the variance of each region. Other embodiments may utilize other methods of determining contrast. The scores of each of the regions shown in FIG. 5 can be compared with the scores of corresponding regions of other images in the stack.

FIG. 6 illustrates the comparison of a contrast score for a corresponding region in all images in an image stack, according to one example. In this example, the images in the image stack are video frames, with frame numbers ranging from 0 to approximately 170. As the graph illustrates, the contrast score among the regions varies substantially, but the maximum score 500 can be easily determined Thus, the corresponding image (frame 90) can be determined as the image in which the respective region is most in focus. If the user selects the respective region when viewing the refocusable image, the corresponding image will be displayed.

It can be noted that objects in the image stack may move while the images of the image stack are being captured. A user may select a region of a first image in the image stack in which an object is out of focus, hoping to see the object in focus. However, if the object is moving, it may be at a different location (or completely missing) from a second image in the image stack having the highest contrast for that region. In such cases, techniques could be implemented to adjust how such images are displayed. For example, color information of corresponding regions in an image stack can be used to determine whether an object in those regions has moved from one image to another. If an object from a selected region is determined to have moved (e.g., color information from a selected region of a first image and a corresponding highest-contrast region of a second image indicates an object in that region has moved) then, in some embodiments, no refocusing would take place (i.e., the second image would not be displayed). In some embodiments, the second image would be displayed, and the user would be notified (e.g., via text on the display) that and object in the selected image has moved. Some embodiments may show a slideshow of some or all of the images in the image stack to illustrate to the user the motion of the object. Other embodiments may employ yet other techniques of compensating for such motion.

All or a portion of the image processing described in relation to FIGS. 3-6 can occur prior to and/or during the display of the corresponding refocusable image to the user, depending on the desired functionality. Moreover, processing may occur on a single device (e.g., the mobile device 110 of FIG. 1) or multiple devices (e.g., the mobile device 110 and the display device 120 of FIG. 1). Furthermore, depending on desired functionality, display of the refocusable image may be provided by a display device (e.g., the display device shown in FIG. 1) or by the mobile device itself.

Figure 7:
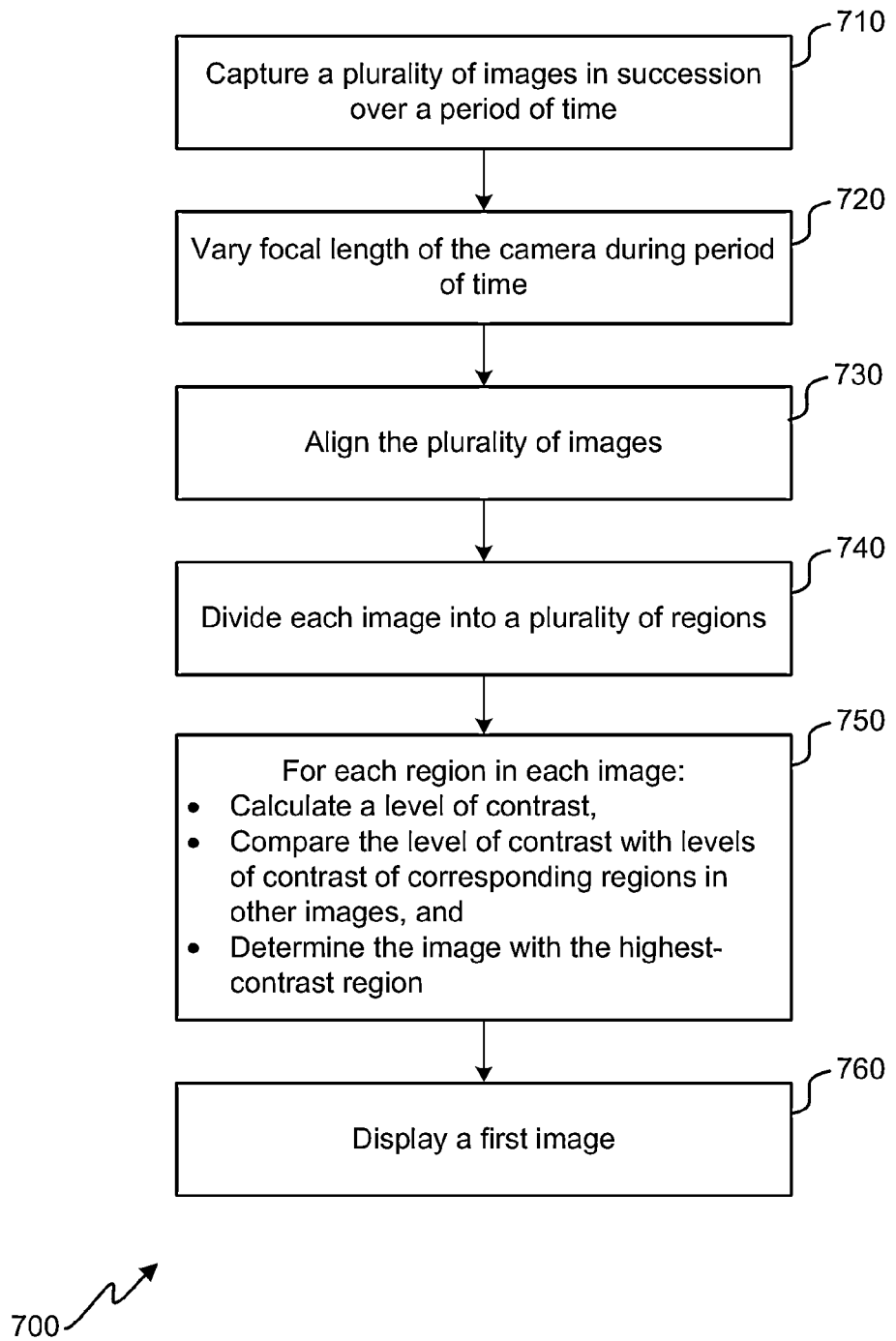
FIG. 7 illustrates an embodiment of a method of image capture and processing.

FIG. 7 illustrates an embodiment of a method 700 of image capture and processing. Means for performing one or more of the components of the method 700 can include hardware and/or software means described in further detail in relation to FIG. 8. Alternative embodiments may include alterations to the embodiments shown. Components of the method 700, although illustrated in a particular order, may be performed in a different order and/or simultaneously, according to different embodiments. Moreover, a person of ordinary skill in the art will recognize many additions, omissions, and/or other variations.

At block 710, a plurality of images is captured in succession over a period of time. As indicated previously, the period of time can vary depending on various factors, including the number of images captured and/or the exposure time for each image. In some instances, for example, an exposure time may be 10 ms. In other instances, such as in low light, exposure time may be 20 ms or more. Exposure times may be greater, less than, or in between these values, depending on camera optics, ambient light, and/or other factors. Furthermore, exposure times for some images in the plurality of images can be greater than other images in the plurality of images.

At block 720, the focal length of the camera is varied during the period of time. This results in the plurality of images having different focal lengths. Each image of the plurality of images can be captured using a different, unique focal length. The focal lengths can be predetermined, based on popular focal lengths and or a range of popular focal lengths. The difference between focal lengths of successive images can be uniform, or may vary (e.g., a high number of images corresponding to small focal lengths, decreasing as focal lengths get larger). Other methods of determining focal lengths, such as those described previously, can additionally or alternatively be used.

At block 730, the plurality of images are aligned, forming an image stack. As indicated earlier, image alignment, or registration, can comprise using motion sensor data taken during the period of time in which the plurality of images is captured. An example of such alignment is sensor-based EIS in which motion sensor data is used in conjunction with image data to determine any motion (e.g., translation and/or rotation) that occurs between the capture of images. Once the motion is determined, images can be aligned to compensate for such motion. Motion sensor data can include data from one or more gyroscopes, accelerometers, cameras, and/or other sensors that can detect movement. Furthermore, according to some embodiments, aligning can occur in real time, during the period of time in which the plurality of images is captured. As discussed above, alignment may include image scaling, shifting, and/or rotating.

At block 740, each image is divided into a plurality of regions. As indicated in FIGS. 3 and 4, these regions can be utilized in image processing to determine, for each region, the most in-focus region among the plurality of images. Images can be divided according to a grid or other pattern, and the granularity of the grid (i.e., size of the regions) can vary, as described above, depending on desired functionality.

At block 750, the plurality of images are processed by, for each region in each image of the plurality of images, calculating a level of contrast, comparing the level of contrast with levels of contrast of corresponding regions on other images, and determining the image with the highest-contrast regions. As indicated previously, a level of contrast can be calculated by calculating the variance of a region. As shown in FIG. 6, contrast scores among corresponding regions to determine the image having the corresponding region with the highest contrast, (which is indicative of being the most in focus). Depending on the embodiment, the functionality of block 750 can be performed by a mobile device, a display device, or another computing device.

At block 760, a first image is displayed. As indicated previously, the plurality of images (image stack) effectively functions as a refocusable image that allows users to select a portion of the refocusable image to be in focus. The corresponding image that has the highest contrast for the selected portion is then shown to the user. The first image of the plurality of images can be displayed based on any of a variety of factors (e.g., the first image captured, the image having the highest number of in-focus regions, the images having an in-focus region at a certain location, etc.)

Figure 8:
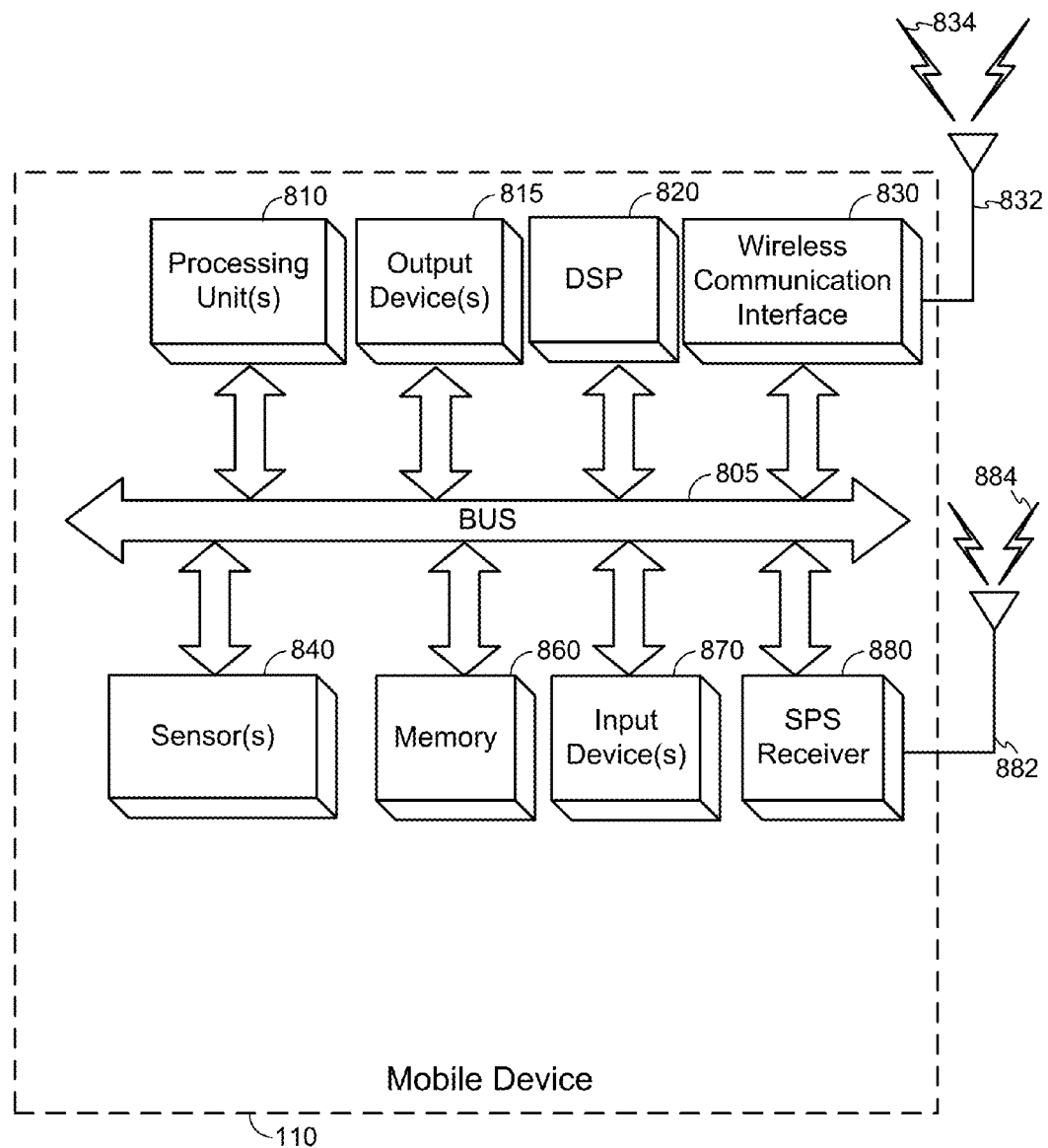
FIG. 8 illustrates an embodiment of a mobile device, which can implement the image capture, processing, and/or display techniques discussed herein.

FIG. 8 illustrates an embodiment of a mobile device 110, which can implement the image capture, processing, and/or display techniques discussed herein, such as the method 700 shown in FIG. 7. It should be noted that FIG. 8 is meant only to provide a generalized illustration of various components, any or all of which may be utilized as appropriate. Moreover, system elements may be implemented in a relatively separated or relatively more integrated manner. Additionally or alternatively, some or all of the components shown in FIG. 8 can be utilized in another computing device, such as the display device 120 of FIG. 1, which can be used with a mobile device 110 as previously described.

The mobile device 110 is shown comprising hardware elements that can be electrically coupled via a bus 805 (or may otherwise be in communication, as appropriate). The hardware elements may include a processing unit(s) 810 which can include without limitation one or more general-purpose processors, one or more special-purpose processors (such as digital signal processors (DSPs), graphics acceleration processors, application specific integrated circuits (ASICs), and/or the like), and/or other processing structure or means, which can be configured to perform one or more of the methods described herein, including method 700 illustrated in FIG. 7. As shown in FIG. 8, some embodiments may have a separate DSP 820, depending on desired functionality. The mobile device 110 also can include one or more input devices 870, which can include without limitation one or more camera(s), a touch screen, a touch pad, microphone, button(s), dial(s), switch(es), and/or the like; and one or more output devices 815, which can include without limitation a display, light emitting diode (LED), speakers, and/or the like.

The mobile device 110 might also include a wireless communication interface 830, which can include without limitation a modem, a network card, an infrared communication device, a wireless communication device, and/or a chipset (such as a Bluetooth™ device, an IEEE 802.11 device, an IEEE 802.15.4 device, a WiFi device, a WiMax device, cellular communication facilities, etc.), and/or the like. The wireless communication interface 830 may permit data to be exchanged with a network, wireless access points, other computer systems, and/or any other electronic devices described herein. The communication can be carried out via one or more wireless communication antenna(s) 832 that send and/or receive wireless signals 834.

Depending on desired functionality, the wireless communication interface 830 can include separate transceivers to communicate with base transceiver stations (e.g., base transceiver stations of a cellular network) and access points. These different data networks can include, an OFDMA and/or other type of network.

The mobile device 110 can further include sensor(s) 840. Such sensors can include, without limitation, one or more accelerometer(s), gyroscope(s), camera(s), magnetometer(s), altimeter(s), microphone(s), proximity sensor(s), light sensor(s), and the like. At least a subset of the sensor(s) 840 can provide motion detection for image registration as discussed herein.

Embodiments of the mobile device may also include a Satellite Positioning System (SPS) receiver 880 capable of receiving signals 884 from one or more SPS satellites using an SPS antenna 882. Such positioning can be utilized to complement and/or incorporate the techniques described herein. It can be noted that, as used herein, an SPS may include any combination of one or more global and/or regional navigation satellite systems and/or augmentation systems, and SPS signals may include SPS, SPS-like, and/or other signals associated with such one or more SPS.

The mobile device 110 may further include and/or be in communication with a memory 860. The memory 860 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data structures, such as the FIFO and/or other memory utilized by the techniques described herein, and may be allocated by hardware and/or software elements of an OFDM receiver. Additionally or alternatively, data structures described herein can be implemented by a cache or other local memory of a DSP 820 or processing unit(s) 810. Memory can further be used to store an image stack, motion sensor data, and/or other information described herein.

The memory 860 of the mobile device 110 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above, such as the method 700 described in relation to FIG. 7, might be implemented as code and/or instructions executable by the mobile device 110 (and/or processing unit(s) 810 within a mobile device 110) and/or stored on a non-transitory and/or machine-readable storage medium (e.g., a "computer-readable storage medium," a "machine-readable storage medium," etc.). In an aspect, then, such code and/or instructions can be used to configure and/or adapt a general purpose processor (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method of image capture and processing, the method comprising:
   capturing a plurality of images with a camera, wherein the capturing is triggered by at least one user input, and wherein the plurality of images include a stack of images capturing a scene over a period of time;
   varying a focal length of the camera during the period of time such that each image of the stack of images is captured using a unique focal length;
   processing, with a processing unit, the plurality of images by:
      dividing each image of the stack of images into a plurality of regions, each region of the stack of images having a corresponding region in each image of the stack of images;
      receiving a selection, from a first image in the stack of images, of a region including an object;
      calculating a level of contrast for each region of a set of corresponding regions of the stack of images, the set of corresponding regions including the selected region;
      comparing levels of contrast for regions of the set of corresponding regions;
      determining a second image from the stack of images having a highest-level of contrast in the set of corresponding regions of the stack of images;
      determining whether the object within the selected region is present at a different location in the second image than a location of the object in the first image; and
      causing a display to show the second image with a notification that the object is present at the different location in at least the second image.

2. The method of claim 1, wherein the selected region is selected from an initial displayed image of the plurality of images.

3. The method of claim 1, wherein processing the plurality of images is performed by a computing device other than a mobile device.

4. The method of claim 1, wherein dividing each image of the stack of images into the plurality of regions is based on a number of features detected in the stack of images, and wherein dividing each image.

5. The method of claim 1, wherein dividing each image of the stack of images into the plurality of regions comprises dividing each image into regions of various sizes or shapes based on a number of features detected in the stack of images.

6. The method of claim 1, wherein dividing each image of the stack of images into the plurality of regions comprises dividing each image into a grid, wherein a number of rows and a number of columns in the grid are determined based on a number of features detected in the stack of images.

7. The method of claim 1, wherein the notification includes a text notification.

8. The method of claim 1, further comprising causing the display to show at least a third image.

9. The method of claim 8, further comprising causing the display to show the first image, the second image, and at least the third image, wherein the first image, the second image, and at least the third image include the object.

10. The method of claim 1, further comprising:
    removing, from the stack of images, at least one image in which none of the plurality of regions of the at least one image is determined to be a highest-contrast region among the corresponding regions of the stack of images.

11. An apparatus comprising:
    a memory;
    a display; and
    a processing unit communicatively coupled with the memory, wherein the processing unit is configured to perform functions including:
    obtaining a plurality of images captured by a camera of a mobile device, wherein capturing of the plurality of images is triggered by at least one user input, wherein the plurality of images include a stack of images capturing a scene over a period of time, and wherein a focal length of the camera is varied during the period of time such that each image of the stack of images is captured using a unique focal length;
    processing the plurality of images by:
       dividing each image of the stack of images into a plurality of regions, each region of the stack of images having a corresponding region in each image of the stack of images;
       receiving a selection, from a first image in the stack of images, of a region including an object;
       calculating a level of contrast for each region of a set of corresponding regions of the stack of images, the set of corresponding regions including the selected region;
       comparing levels of contrast for regions of the set of corresponding regions;
       determining a second image from the stack of images having a highest-level of contrast in the set of corresponding regions of the stack of images; and
       determining whether the object within the selected region is present at a different location in the second image than a location of the object in the first image; and
    causing the display to show a notification that the object is present at the different location in at least the second image.

12. The apparatus of claim 11, wherein the apparatus comprises the mobile device.

13. The apparatus of claim 11, wherein the notification includes a text notification.

14. The apparatus of claim 11, wherein the processing unit is further configured to cause the display to show at least a third image.

15. The apparatus of claim 14, wherein the processing unit is further configured to cause the display to show the first image, the second image, and at least the third image, wherein the first image, the second image, and at least the third image include the object.

16. The apparatus of claim 11, wherein the processing unit is further configured to:
    remove, from the stack of images, at least one image in which none of the plurality of regions of the at least one image is determined to be a highest-contrast region among the corresponding regions of the stack of images.

17. A non-transitory computer-readable storage medium having stored thereon instructions that, when executed by one or more processors, cause the one or more processors to:
obtain a plurality of images captured with a camera of a mobile device, wherein capturing of the plurality of images is triggered by at least one user input, and wherein the plurality of images include a stack of images capturing a scene over a period of time;
cause the camera to vary a focal length during the period of time such that each image of the stack of images is captured using a unique focal length;
process the plurality of images by:
dividing each image of the stack of images into a plurality of regions, each region of the stack of images having a corresponding region in each image of the stack of images;
receiving a selection, from a first image in the stack of images, of a region including an object;
calculating a level of contrast for each region of a set of corresponding regions of the stack of images, the set of corresponding regions including the selected region;
comparing levels of contrast for regions of the set of corresponding regions;
determining a second image from the stack of images having a highest-level of contrast of the set in corresponding regions of the stack of images; and
determining whether the object within the selected region is present at a different location in the second image than a location of the object in the first image; and
cause a display to show a notification that the object is present at the different location in at least the second image.

18. The non-transitory computer-readable storage medium of claim 17, further comprising instructions that, when executed by one or more processors, cause the one or more processors to align images of the stack of images, wherein aligning the plurality of images comprises at least one of:
scaling one or more images of the plurality of images,
shifting one or more images of the plurality of images,
rotating one or more images of the plurality of images, or
adjusting a brightness of one or more images of the plurality of images.

* * * * *